(12) United States Patent
Yamada et al.

(10) Patent No.: US 8,348,353 B2
(45) Date of Patent: Jan. 8, 2013

(54) BRAKE CONTROL DEVICE FOR VEHICLE

(75) Inventors: Yoshihisa Yamada, Suntoh-gun (JP); Yasushi Kobayashi, Toyota (JP); Tatsushi Takasu, Toyota (JP); Kota Shimoga, Suita (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 907 days.

(21) Appl. No.: 12/375,546

(22) PCT Filed: Nov. 28, 2007

(86) PCT No.: PCT/JP2007/072967
§ 371 (c)(1),
(2), (4) Date: Jan. 29, 2009

(87) PCT Pub. No.: WO2008/072472
PCT Pub. Date: Jun. 19, 2008

(65) Prior Publication Data
US 2009/0184572 A1 Jul. 23, 2009

(30) Foreign Application Priority Data
Dec. 11, 2006 (JP) ................................. 2006-333671

(51) Int. Cl.
*B60T 8/56* (2006.01)
(52) U.S. Cl. .......... 303/143; 303/190; 180/197; 701/80; 701/81; 701/89
(58) Field of Classification Search .................. 303/140, 303/141, 142, 143, 146, 150, 165, 190; 701/70, 701/72, 80–83, 90; 180/197, 244; 477/92
See application file for complete search history.

(56) References Cited

U.S. PATENT DOCUMENTS
4,765,429 A * 8/1988 Sato .............................. 180/197
(Continued)

FOREIGN PATENT DOCUMENTS
JP 2000 344077 12/2000
(Continued)

OTHER PUBLICATIONS
Office Action issued Jan. 27, 2011, in German Patent Application No. 11 2007 003 029.1-21 (with English Translation).
(Continued)

*Primary Examiner* — Bradley King
*Assistant Examiner* — Thomas Irvin
(74) *Attorney, Agent, or Firm* — Oblon, Spivak, McClelland, Maier & Neustadt, L.L.P.

(57) ABSTRACT

A brake control device that controls braking forces applied to wheels to stabilize the behavior of a vehicle turning a corner, and includes a turning condition detection unit detecting a turning condition of the vehicle; a braking amount setting unit setting braking amounts for the respective wheels based on the turning condition detected by the turning condition detection unit; a brake control unit applying braking forces to the wheels according to the braking amounts set by the braking amount setting unit; and a road surface friction coefficient estimation unit estimating a road surface friction coefficient of the road on which the vehicle is running. The braking amount setting unit changes upper limits of the braking amounts for the respective wheels according to the road surface friction coefficient when the vehicle is in a center differential lock mode or a direct four-wheel drive mode.

12 Claims, 10 Drawing Sheets

U.S. PATENT DOCUMENTS

| | | | | |
|---|---|---|---|---|
| 5,358,319 A * | 10/1994 | Negrin | | 303/149 |
| 5,425,574 A * | 6/1995 | Sano | | 303/177 |
| 5,487,596 A * | 1/1996 | Negrin | | 303/149 |
| 5,615,935 A * | 4/1997 | Beyer et al. | | 303/195 |
| 5,685,618 A * | 11/1997 | Uchida et al. | | 303/146 |
| 5,762,406 A * | 6/1998 | Yasui et al. | | 303/146 |
| 6,208,929 B1 * | 3/2001 | Matsuno et al. | | 701/89 |
| 6,219,609 B1 * | 4/2001 | Matsuno et al. | | 701/72 |
| 6,466,857 B1 * | 10/2002 | Belvo | | 701/82 |
| 6,473,682 B1 * | 10/2002 | Nakamura | | 701/74 |
| 6,564,140 B2 * | 5/2003 | Ichikawa et al. | | 701/91 |
| 6,595,602 B2 * | 7/2003 | Jokic et al. | | 303/147 |
| 6,641,234 B2 * | 11/2003 | Kost et al. | | 303/190 |
| 6,702,717 B2 | 3/2004 | Murakami | | |
| 6,820,947 B2 * | 11/2004 | Atoche-Juarez et al. | | 303/190 |
| 6,851,766 B2 * | 2/2005 | Ishikawa et al. | | 303/139 |
| 7,113,858 B2 * | 9/2006 | Miyazaki | | 701/71 |
| 7,125,086 B2 * | 10/2006 | Tanaka et al. | | 303/190 |
| 7,693,639 B2 * | 4/2010 | Suzuki et al. | | 701/71 |
| 2002/0057014 A1 * | 5/2002 | Atoche-Juarez et al. | | 303/186 |
| 2002/0109402 A1 * | 8/2002 | Nakamura | | 303/146 |
| 2002/0180265 A1 | 12/2002 | Jokic et al. | | |
| 2003/0102713 A1 | 6/2003 | Murakami | | |
| 2003/0218378 A1 | 11/2003 | Tanaka et al. | | |
| 2004/0046447 A1 * | 3/2004 | Wanke et al. | | 303/140 |
| 2005/0012386 A1 * | 1/2005 | Nakano et al. | | 303/114.1 |
| 2005/0085988 A1 * | 4/2005 | Ushiroda et al. | | 701/80 |
| 2005/0116536 A1 * | 6/2005 | Schafiyha et al. | | 303/139 |

FOREIGN PATENT DOCUMENTS

| | | |
|---|---|---|
| JP | 2001-10475 | 1/2001 |
| JP | 2004 114794 | 4/2004 |
| JP | 2004 210151 | 7/2004 |
| JP | 2004 352166 | 12/2004 |

OTHER PUBLICATIONS

Office Action issued Dec. 15, 2011, in Chinese Patent Application No. 200780041974.2 (with English translation).

* cited by examiner

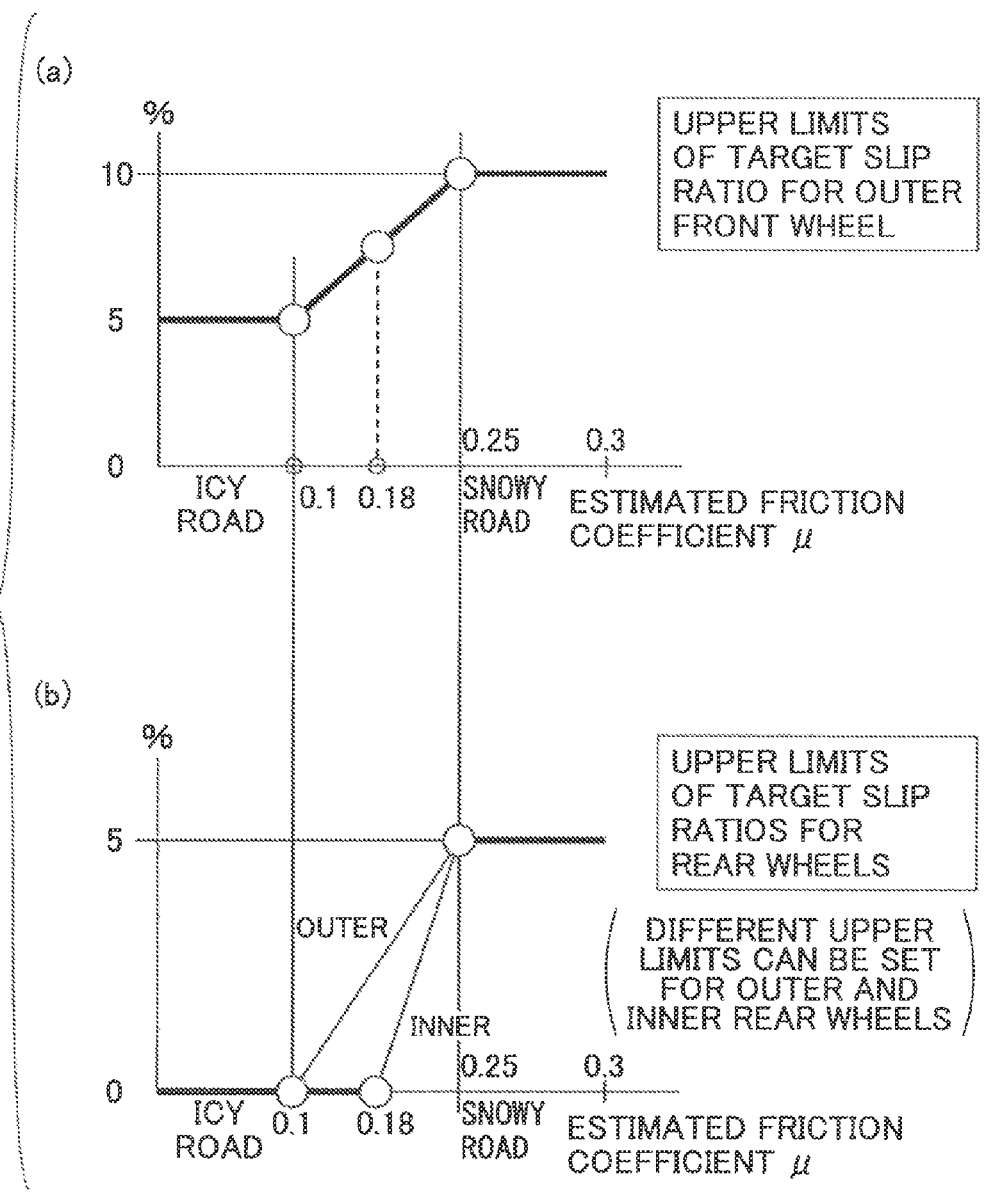

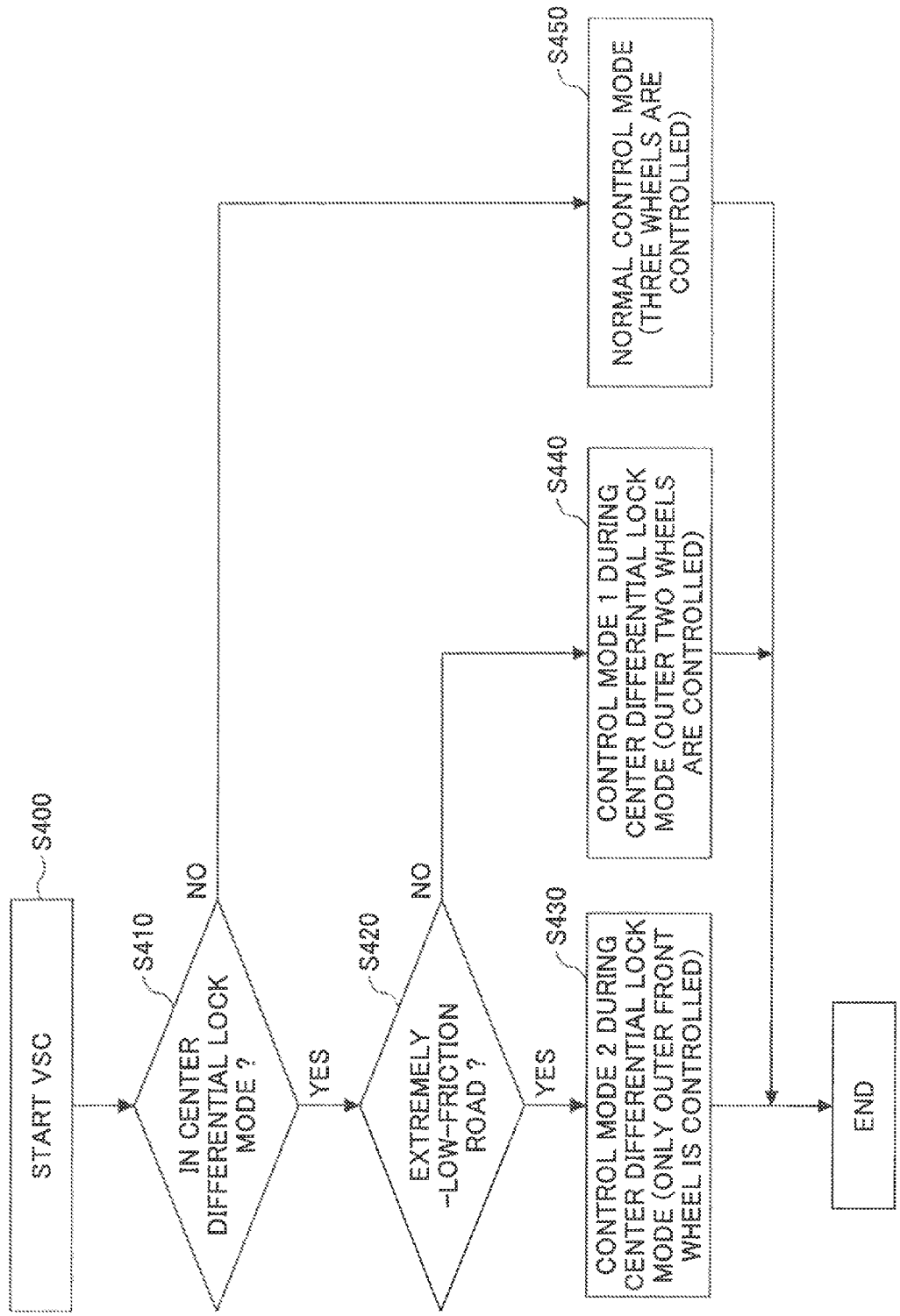

BRAKE CONTROL DEVICE FOR VEHICLE

TECHNICAL FIELD

The present invention generally relates to a brake control device for a vehicle. More particularly, the present invention relates to a brake control device for stabilizing the behavior of a full-time four-wheel drive vehicle in a center differential lock mode or of a part-time four-wheel drive vehicle in a direct four-wheel-drive mode.

BACKGROUND ART

Vehicle behavior control devices control braking forces applied to individual wheels of a vehicle turning a corner according to the behavior of the vehicle. Meanwhile, when a center differential of a vehicle is locked, the rotational speeds of the rear wheels are restricted by those of the front wheels. Therefore, if a vehicle behavior control device is used while a center differential is locked, an unintended braking force or driving force may be applied to a wheel, and the balance between the front and rear wheels in terms of the anti-spin moment and the tire lateral force may change. Patent document 1 discloses a vehicle behavior control device intended to solve this problem. The disclosed vehicle behavior control device stops engine output control and brake control on the wheels while a center differential is locked to prevent undesired effects of vehicle behavior control.
[Patent document 1] Japanese Patent Application Publication No. 2000-344077

DISCLOSURE OF INVENTION

Problems to be Solved by the Invention

However, with the configuration disclosed in patent document 1, no vehicle behavior control is performed to assist the driver while the center differential is locked. In other words, the driver cannot receive the benefit of the vehicle behavior control device while the center differential is locked.

Embodiments of the present invention provide a brake control device that can appropriately perform brake control to assist a driver even when a vehicle is in a center differential lock mode or a direct four-wheel drive mode.

Means for Solving the Problems

A first aspect of the present invention provides a brake control device for controlling braking forces applied to wheels and thereby stabilizing behavior of a vehicle turning a corner. The brake control device includes a turning condition detection unit configured to detect a turning condition of the vehicle; a braking amount setting unit configured to set braking amounts for the respective wheels of the vehicle based on the turning condition detected by the turning condition detection unit; a brake control unit configured to apply braking forces to the wheels according to the braking amounts set by the braking amount setting unit; and a road surface friction coefficient estimation unit configured to estimate a road surface friction coefficient of a road on which the vehicle is running; wherein the braking amount setting unit is configured to change upper limits of the braking amounts for the respective wheels according to the road surface friction coefficient estimated by the road surface friction coefficient estimation unit when the vehicle is in a center differential lock mode or a direct four-wheel drive mode. This configuration makes it possible to stabilize the behavior of a vehicle by applying braking forces to the wheels even when the vehicle is in a center differential lock mode or a direct four-wheel drive mode.

According to a second aspect of the present invention, if the road surface friction coefficient of the road is less than that of a compacted snow road, the braking amount setting unit of the brake control device is configured to set the upper limits of the braking amounts less than those used when the vehicle is not in the center differential lock mode or the direct four-wheel drive mode. This configuration makes it possible to stabilize the behavior of a vehicle by applying braking forces to the wheels even on a road with a low road surface friction coefficient.

According to a third aspect of the present invention, if the road surface friction coefficient is less than a first threshold value, the braking amount setting unit of the brake control device is configured to set the upper limits of the braking amounts for rear wheels to zero and to set the braking amount only for an outer front wheel. This configuration makes it possible to stabilize the behavior of a vehicle by applying braking forces to the wheels even on a road such as an icy road with an extremely-low road surface friction coefficient.

According to a fourth aspect of the present invention, if the road surface friction coefficient is not less than the first threshold value and not greater than a second threshold value, the braking amount setting unit of the brake control device is configured to set the upper limit of the braking amount for an inner rear wheel to zero and to set the braking amounts for the outer front wheel and an outer rear wheel. This configuration makes it possible to stabilize the behavior of a vehicle by applying braking forces to the wheels even on a road covered with ice and snow and having a road surface friction coefficient that is low but greater than the friction coefficient of an icy road.

According to a fifth embodiment of the present invention, if the road surface friction coefficient is greater than the second threshold value, the braking amount setting unit of the brake control device is configured to set the braking amounts for three wheels other than an inner front wheel. This configuration makes it possible to stabilize the behavior of a vehicle on a road with a relatively-high road surface friction coefficient by applying braking forces to three wheels other than a reference wheel.

Advantageous Effect of the Invention

Embodiments of the present invention make it possible to appropriately perform brake control according to a road surface friction coefficient even when a full-time four-wheel drive vehicle is in a center differential lock mode or when a part-time four-wheel drive vehicle is in a direct four-wheel-drive mode, and thereby to control the vehicle to smoothly turn a corner.

BRIEF DESCRIPTION OF THE DRAWINGS

FIG. 5A shows a relationship between slip ratios of the outer front wheel and the rear wheel when the slip ratio of the outer front wheel is not limited, and FIG. 5B shows a relationship between slip ratios of the outer front wheel and the rear wheel when the slip ratio of the outer front wheel is limited to be less than a target slip ratio SL;

FIG. 10 is a drawing used to describe the calculation of upper limits of braking amounts by a braking amount setting unit 20, FIG. 10 (*a*) shows exemplary upper limits of a target slip ratio SL for an outer front wheel, and FIG. 10 (*b*) shows exemplary upper limits of target slip ratios SL for rear wheels; and FIG. 11 is a flowchart showing another brake control process of the brake control device 80, which is different from that shown in FIG. 9.

EXPLANATION OF REFERENCES

Figure 1:
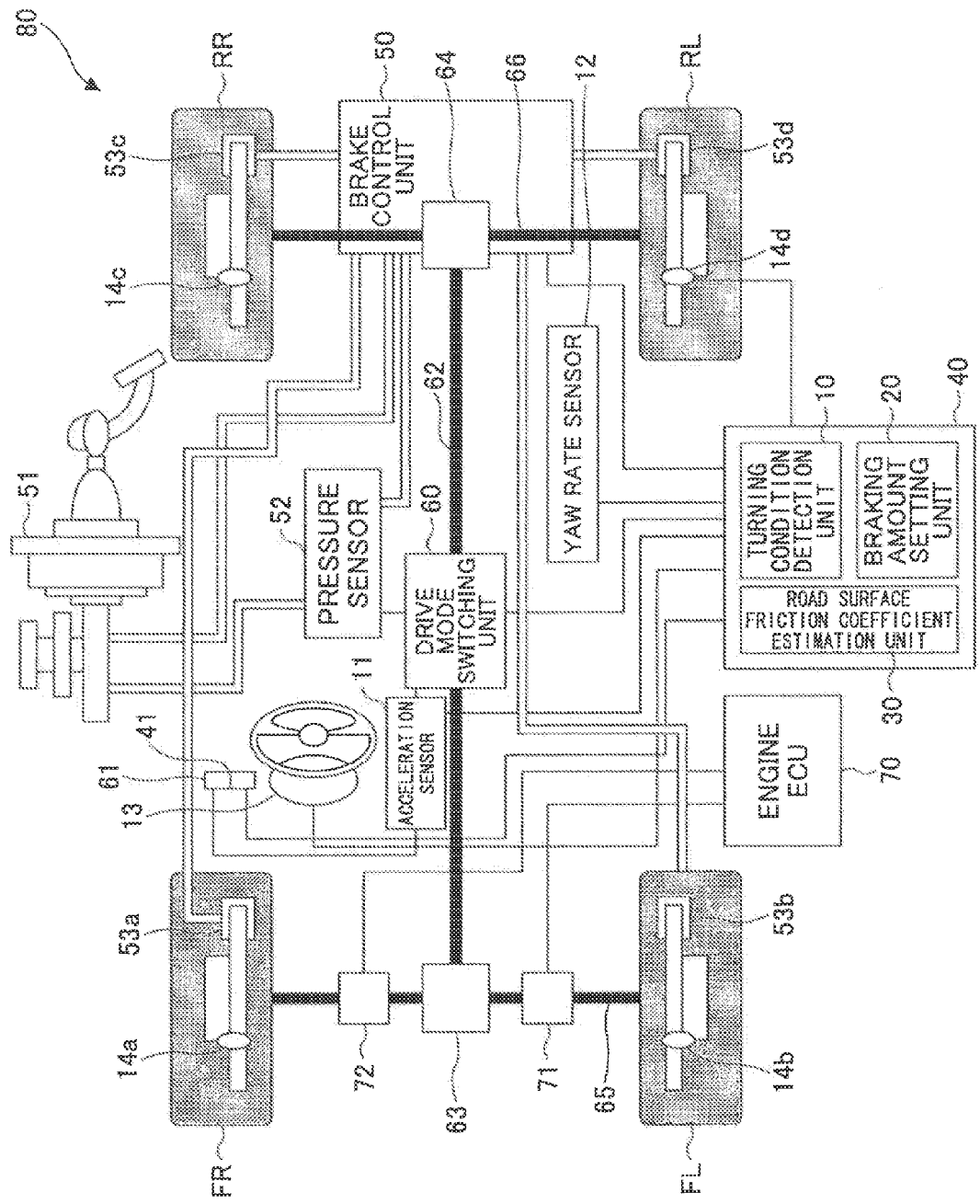
FIG. 1 is a schematic diagram of a brake control device 80 for a vehicle according to an embodiment of the present invention.

10 Turning condition detection unit
11 Acceleration sensor
12 Yaw rate sensor
13 Steering angle sensor
14*a*, 14*b*, 14*c*, 14*d* Wheel speed sensor
20 Braking amount setting unit
30 Road surface friction coefficient estimation unit
40 Vehicle stability control ECU
41 Input switch
50 Brake control unit
51 Master cylinder
52 Pressure sensor
53*a*, 53*b*, 53*c*, 53*d* Wheel cylinder
60 Drive mode switching unit
61, 61*a*, 61*b* Drive mode selection switch
62, 62F, 62R Propeller shaft
63 Front differential
64 Rear differential
65 Front axle
66 Rear axle
70 Engine ECU
71 Throttle actuator
72 Throttle position sensor
73 Engine
80 Brake control device

BEST MODE FOR CARRYING OUT THE INVENTION

The best mode for carrying out the invention is described based on the following embodiments with reference to the accompanying drawings.

FIG. 1 is a schematic diagram of a brake control device 80 for a vehicle according to an embodiment of the present invention. The brake control device 80 includes a turning condition detection unit 10, a braking amount setting unit 20, a road surface friction coefficient estimation unit 30, and a brake control unit 50 such as a brake actuator.

Components of a vehicle that are in connection with the brake control device 80 include a front differential 63, a rear differential 64, a propeller shaft 62 connected to the front and rear differentials 63 and 64, a front axle 65 connected to the front differential 63, front wheels FR and FL connected to the front axle 65, a rear axle 66 connected to the rear differential 64, and rear wheels RR and RL connected to the rear axle 66. In this embodiment, the vehicle may be a full-time four-wheel drive vehicle or a part-time four-wheel drive vehicle. Also, a drive mode switching unit 60 is provided in the middle of the propeller shaft 62. In the case of a full-time four-wheel drive vehicle, the drive mode switching unit 60 represents a center differential; and in the case of a part-time four-wheel drive vehicle, the drive mode switching unit 60 represents a locking mechanism for the propeller shaft 62.

The drive mode switching unit 60 may be configured to switch drive modes according to a drive mode selection switch 61. The drive mode selection switch 61 may also be used to switch drive modes of the rear differential 64 if necessary.

Figure 2:
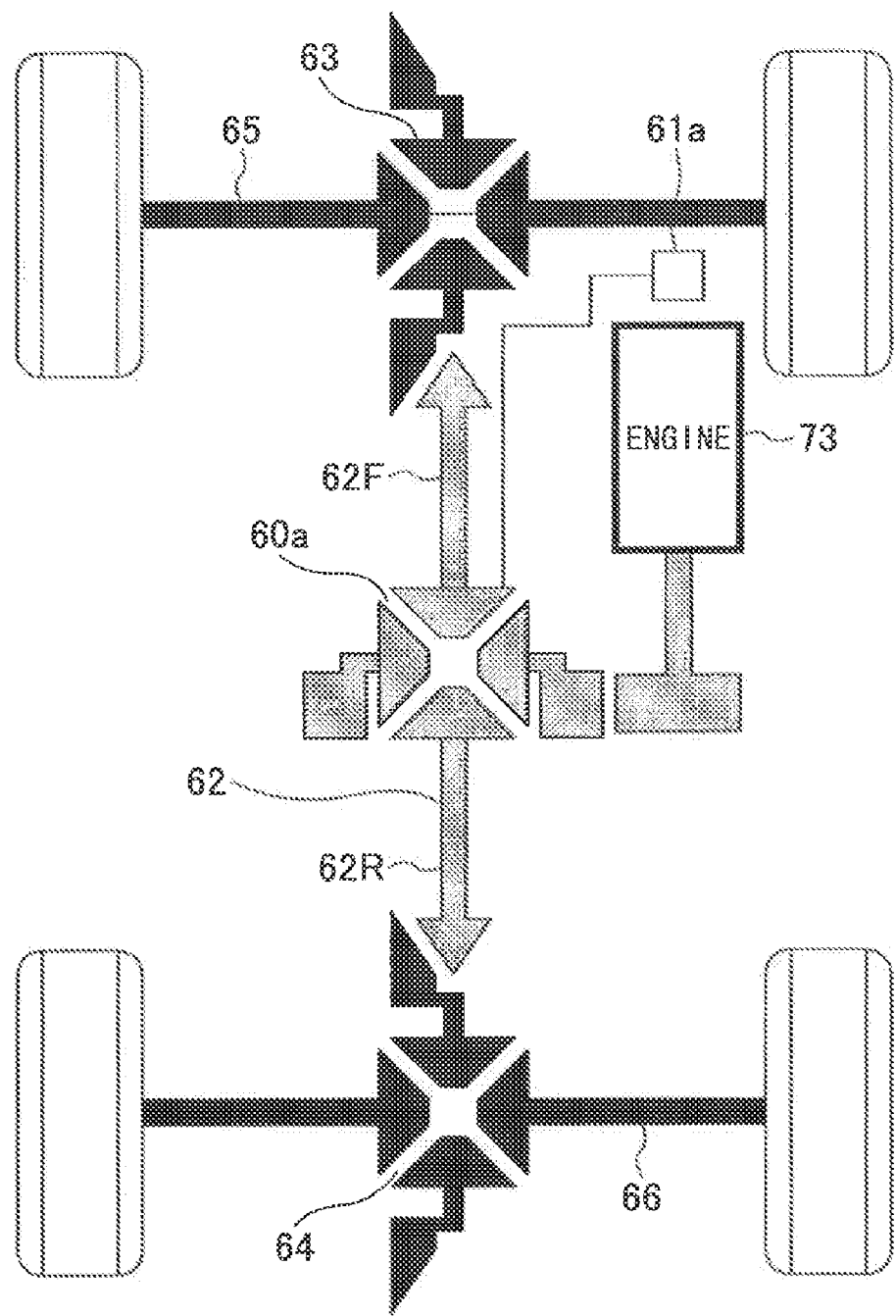
FIG. 2 is a schematic diagram of a full-time four-wheel drive vehicle.

FIG. 2 is a schematic diagram of a full-time four-wheel drive vehicle. As shown in FIG. 2, the driving force from an engine 73 is distributed via a center differential 60*a* to a front propeller shaft 62F and a rear propeller shaft 62R. The driving force transmitted to the front propeller shaft 62F is transmitted via the front differential 63 to the front axle 65, and the driving force transmitted to the rear propeller shaft 62R is transmitted via the rear differential 64 to the rear axle 66. The center differential 60*a* normally allows front wheels and rear wheels to rotate at different speeds. When locked by the user, the center differential 60*a* prevents the front and rear wheels from rotating at different speeds. This drive mode is called a center differential lock mode. For example, when the center differential 60*a* is locked by the operation of a drive mode selection switch 61*a*, the rotational speeds of the front propeller shaft 62F and the rear propeller shaft 62R become equal, and accordingly, the average rotational speed of the right and left front wheels and the average rotational speed of the right and left rear wheels become equal. The brake control device 80 of this embodiment may be used in the center differential lock mode.

Figure 3:
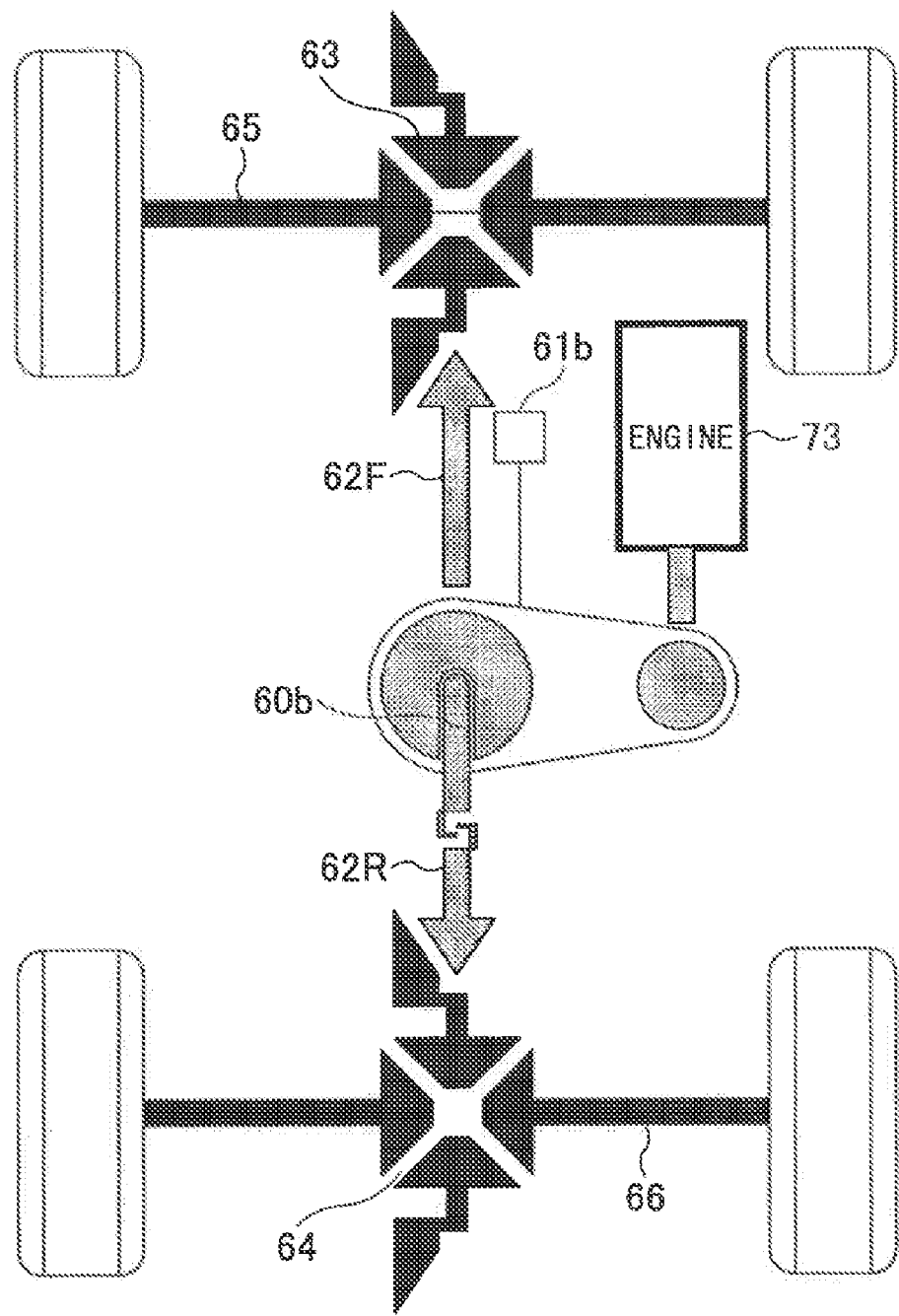
FIG. 3 is a schematic diagram of a part-time four-wheel drive vehicle.

FIG. 3 is a schematic diagram of a part-time four-wheel drive vehicle. The part-time four-wheel drive vehicle shown in FIG. 3 includes a locking mechanism 60*b* instead of the center differential 60*a* of the full-time four-wheel drive vehicle shown in FIG. 2. The part-time four-wheel drive vehicle is normally driven in a two-wheel drive mode, and when necessary, the front and rear propeller shafts 62F and 62R are directly coupled. For example, when a transfer lever 61*b* is operated, the front and rear propeller shafts 62F and 62R are directly coupled. This drive mode is called a direct four-wheel drive mode that is the equivalent of the center differential lock mode of the full-time four-wheel drive vehicle. The brake control device 80 of this embodiment may also be used in the direct four-wheel drive mode.

As described above with reference to FIGS. 2 and 3, the center differential lock mode of a full-time four-wheel vehicle and the direct four-wheel drive mode of a part-time four-wheel drive vehicle indicate substantially the same drive mode where the front propeller shaft 62F and the rear propeller shaft 62R rotate at the same rotational speed. Therefore, in the specification and figures of the present application, the direct four-wheel drive mode may indicate both the direct four-wheel drive mode of a part-time four-wheel drive vehicle and the center differential lock mode of a full-time four-wheel drive vehicle.

Components of the brake control device 80 are described below with reference to FIG. 1.

The turning condition detection unit 10 detects a turning condition of a vehicle. The turning condition detection unit 10, for example, receives a vertical acceleration and/or a lateral acceleration of the vehicle from an acceleration sensor 11, a yaw rate from a yaw rate sensor 12, a steering angle from a steering angle sensor 13, and a vehicle speed and/or wheel speeds from wheel speed sensors 14. Based on the outputs from the sensors, the turning condition detection unit 10 detects a turning condition such as a sideslip. For example, the turning condition detection unit 10 detects a rear wheel sideslip based on a slip angle and a slip angle rate of the vehicle, and detects a front wheel sideslip by calculating a target yaw rate desired by the driver based on a steering angle and a vehicle speed and by comparing the target yaw rate with an actual yaw rate of the vehicle. The turning condition detected by the turning condition detection unit 10 is sent to the braking amount setting unit 20.

Based on the turning condition sent from the turning condition detection unit 10, the braking amount setting unit 20 calculates braking amounts. Specifically, if a sideslip is detected as a turning condition, the braking amount setting unit 20 determines braking amounts to be applied to the wheels FR, FL, RR, and RL such that a counter-moment offsetting the sideslip is applied to the vehicle. For example, if a large amount of rear wheel sideslip is detected, the braking amount setting unit 20 calculates braking amounts for the outer front and rear wheels to apply a stabilizing moment to the vehicle and thereby to reduce the rear wheel sideslip. Brake control is performed on three wheels other than the inner front wheel. The inner front wheel is used as a reference wheel when controlling the other three wheels.

As described above, the braking amount setting unit 20 calculates a stabilizing moment for stabilizing a vehicle turning a corner and calculates braking amounts to be applied to the wheels based on the stabilizing moment. In this process, the braking amount setting unit 20 also determines whether to output the calculated braking amounts. Necessary braking amounts vary depending on the driving mode of a vehicle and a road surface friction coefficient μ. Therefore, after calculating a stabilizing moment based on a turning condition of the vehicle and calculating braking amounts based on the stabilizing moment, the braking amount setting unit 20 determines whether to output the calculated braking amounts without change taking into account the above factors. The brake control device 80 of this embodiment is designed to be used when a four-wheel drive vehicle is in the direct four-wheel drive mode. Therefore, necessary braking amounts are influenced by factors that are different from those used for a two-wheel drive vehicle. The braking amount setting unit 20 determines braking amounts taking into account such factors. In this embodiment, braking amounts are held within the corresponding upper limits, and the upper limits are changed according to the road surface friction coefficient. Details of this process are described later. In short, the braking amount setting unit 20 calculates a stabilizing moment based on a turning condition detected by the turning condition detection unit 10 and determines braking amounts for the respective wheels such that the stabilizing moment is achieved. In this process, if a determined braking amount for a wheel is greater than the upper limit, the braking amount setting unit 20 sets the upper limit as the braking amount for the wheel. The upper limits of braking amounts are changed according to the road surface friction coefficient μ of a road on which the vehicle is running.

The upper limits of braking amounts may be set to zero. When the upper limit of braking amount for a wheel is zero, it indicates that the braking amount for the wheel is not to be output and that the wheel is, in effect, excluded from "control target wheels" that are to be controlled. The braking amount setting unit 20 calculates a stabilizing moment based on a turning condition from the turning condition detection unit 10 and determines braking amounts for three wheels based on the stabilizing moment. However, if the upper limit of the braking amount for a wheel is set to zero, the braking amount setting unit 20 does not output the braking amount for the wheel, and excludes the wheel from the control target wheels. In one case, only the outer front wheel is selected as the control target wheel. In another case, the outer front and rear wheels are selected as the control target wheels. Details of selecting control target wheels are provided later.

The braking amounts determined by the braking amount setting unit 20 are sent to the brake control unit 50. Although the braking amounts are eventually used to control brake pressures applied to wheel cylinders 53a, 53b, 53c, and 53d of brake calipers of the respective wheels, the braking amounts may be represented by parameters such as target wheel speeds or target slip ratios that are easily manageable.

The road surface friction coefficient estimation unit 30 estimates a road surface friction coefficient μ of a current road on which the vehicle is running. The brake control device 80 changes the upper limits of braking amounts according to the road surface friction coefficient μ of the current road estimated by the road surface friction coefficient estimation unit 30.

The road surface friction coefficient estimation unit 30 may use any method to estimate the road surface friction coefficient μ. For example, the road surface friction coefficient estimation unit 30 may be configured to estimate the road surface friction coefficient μ based on an experimentally obtained map, a steering angle, and a lateral acceleration. Alternatively, the road surface friction coefficient estimation unit 30 may be configured to estimate the road surface friction coefficient μ based on a deviation of an estimated lateral acceleration obtained based on the steering angle and the vehicle speed from an actual lateral acceleration detected by the acceleration sensor 11.

The road surface friction coefficient μ may vary depending on the conditions of roads. For example, the road surface friction coefficient μ may be about 0.3 on a compacted snow road, about 0.1 on an icy road, and about 0.2 on a road covered by ice and snow. The road surface friction coefficient μ estimated by the road surface friction coefficient estimation unit 30 is sent to the braking amount setting unit 20 and is used to determine the upper limits of braking amounts.

The turning condition detection unit 10, the braking amount setting unit 20, and the road surface friction coefficient estimation unit 30 may be integrated with a vehicle stability control ECU 40.

The vehicle stability control ECU 40 is an electronic control unit (ECU) to control a vehicle stability control (VSC) system. The vehicle stability control ECU 40 automatically calculates braking forces applied to wheels of a vehicle turning a corner to stabilize the behavior of the vehicle. The vehicle stability control ECU 40 may be implemented by a computer that performs calculations according to programs. The vehicle stability control ECU 40 at least includes arithmetic control functions of a vehicle stability control system normally used in a two-wheel drive vehicle. The brake control device 80 of this embodiment may be implemented by adapting a conventional vehicle stability control system to suit a four-wheel drive vehicle in the direct four-wheel drive mode. In such a case, the braking amount setting unit 20 and the road surface friction coefficient estimation unit 30, which are arithmetic functions of the brake control device 80, are preferably integrated with the vehicle stability control ECU 40. The vehicle stability control system may be turned on and off using an input switch 41 provided near a driver's sheet.

In this embodiment, the brake control device 80 is mainly used for brake control, and therefore descriptions of engine output control are omitted. However, the brake control device 80 may also include engine output control functions of a related art vehicle stability control system. For example, the brake control device 80 may include an engine ECU 70, a throttle actuator 71, and a throttle position sensor 72 to control engine output.

The brake control unit 50 may be implemented by a brake actuator and controls braking forces applied to the wheels FR, FL, RR, and RL. The brake control unit 50 controls brake pressures applied to the wheel cylinders 53a, 53b, 53c, and 53d of the wheels FR, FL, RR, and RL based on the braking amounts for the respective wheels sent from the braking amount setting unit 20 and based on the fluid pressure applied by a master cylinder 51 and detected by a pressure sensor 52. The brake control unit 50 may include oil pressure pumps and solenoid valves for controlling the wheel cylinders 53a, 53b, 53c, and 53d.

Next, a process of selecting the control target wheels by the braking amount setting unit 20 is described.

Figure 4:
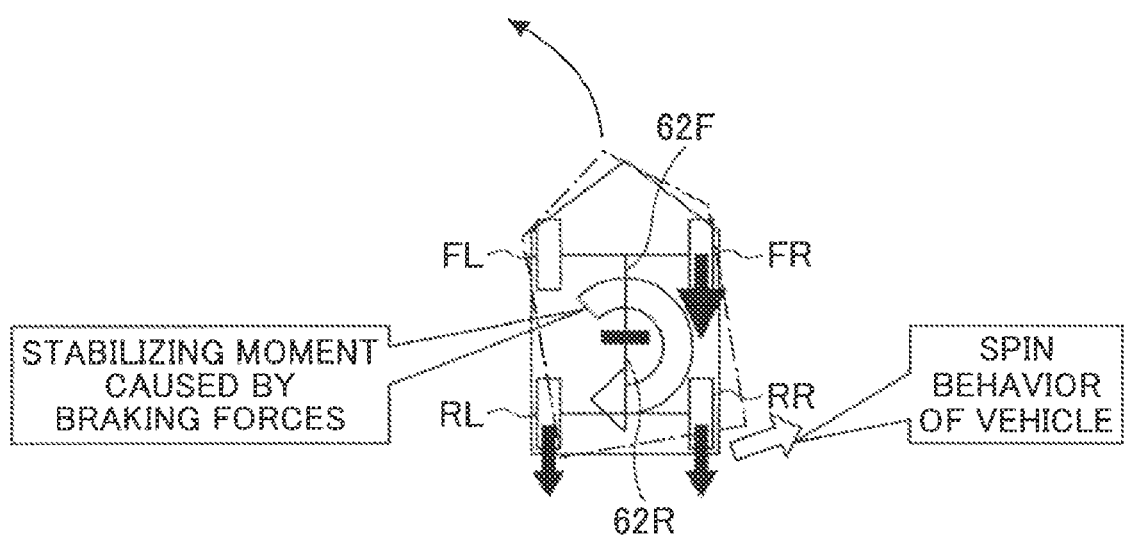
FIG. 4 is a drawing used to describe a problem that may occur if a conventional vehicle stability control system is used when a vehicle is in a direct four-wheel drive mode, and a control method of the brake control device 80 of this embodiment.

FIG. 4 is a drawing used to describe a problem that may occur if a conventional vehicle stability control system is used when a vehicle is in a direct four-wheel drive mode, and a control method of the brake control device 80 of this embodiment. In FIG. 4, it is assumed that the rear wheels RR and RL of the vehicle slip sideways while turning left, i.e., the vehicle oversteers. In such a case, a conventional vehicle stability control system applies braking forces to three wheels FR, RR, and RL excluding the inner front wheel FL used as a reference wheel. In the case of a two-wheel drive vehicle, the applied braking forces cause an anti-spin moment (stabilizing moment) as shown in FIG. 4 that is opposite to the spin behavior of the vehicle.

As another example, assume a case where a braking force is applied only to the outer front wheel FR of a turning vehicle in the direct four-wheel drive mode. As described above, in the direct four-wheel drive mode, the front and rear propeller shafts 62F and 62R rotate at the same speed and the average rotational speed of the front wheels and the average rotational speed of the rear wheels become equal. When a braking force is applied to the outer front wheel FR, the rotational speed of the inner front wheel FL momentarily increases but soon becomes stable and then decreases along with the decrease in the rotational speed of the outer front wheel FR. As a result, the rotational speed of the front propeller shaft 62F decreases. Also, because the rear propeller shaft 62R is directly coupled with the front propeller shaft 62F, the decrease in the rotational speed of the front propeller shaft 62F causes an effect like an engine brake on the rear wheels RR and RL and thereby decreases the rotational speeds of the rear wheels RR and RL. In other words, applying a braking force to the front wheel FR also decreases the rotational speeds of the rear wheels RR and RL as if braking forces are applied to three wheels. If braking forces are applied to three wheels FR, RR, and RL of a vehicle in the direct four-wheel drive mode as in a normal vehicle stability control process, the braking torque generated by the braking force applied to the outer front wheel FR and the braking forces applied to the rear wheels RR and RL are combined. As a result, the combined strong braking forces are applied to the rear wheels RR and RL, and the rotational speeds of the rear wheels RR and RL are excessively decreased. If the rotational speeds of the rear wheels RR and RL decrease excessively, those wheels tend to lock and it becomes difficult to control the lateral force during a turn. If this happens on an extremely-low-friction road such as an icy road with an extremely-low road surface friction coefficient μ, the speeds of the locked rear wheels RR and RL do not promptly recover because of the low road surface friction coefficient μ and it becomes difficult to control the behavior of the vehicle.

Therefore, when a vehicle in the direct four-wheel drive mode is running on an extremely-low-friction road such as an icy road with a road surface friction coefficient μ less than 0.1, it is preferable to apply a braking force only to the outer front wheel so that the speeds of the rear wheels are not decreased excessively and can easily recover.

On a road with a higher surface friction coefficient μ, the decrease in the speeds of the rear wheels is smaller. Therefore, it is preferable to apply braking forces to the outer front and rear wheels (FR and RR in FIG. 4) to cause a larger stabilizing moment. For example, on a road covered with snow and ice and having a surface friction coefficient μ between 0.1 and 0.18, it is preferable to apply braking forces to the outer front and rear wheels.

Thus, the brake control device 80 can stabilize the behavior of a vehicle in the direct four-wheel drive mode even on a road with a low or extremely-low surface friction coefficient μ by changing the control target wheels according to the surface friction coefficient μ. The values of the low and extremely-low surface friction coefficients μ are not limited to those mentioned above. For example, because selection of the control target wheels is influenced not only by the surface friction coefficient μ but also by other factors of a current road and a vehicle type, a threshold value of the surface friction coefficient μ used to select the control target wheels may be determined case by case.

Next, a method of determining the upper limits of braking amounts by the braking amount setting unit 20 is described.

Figure 5:
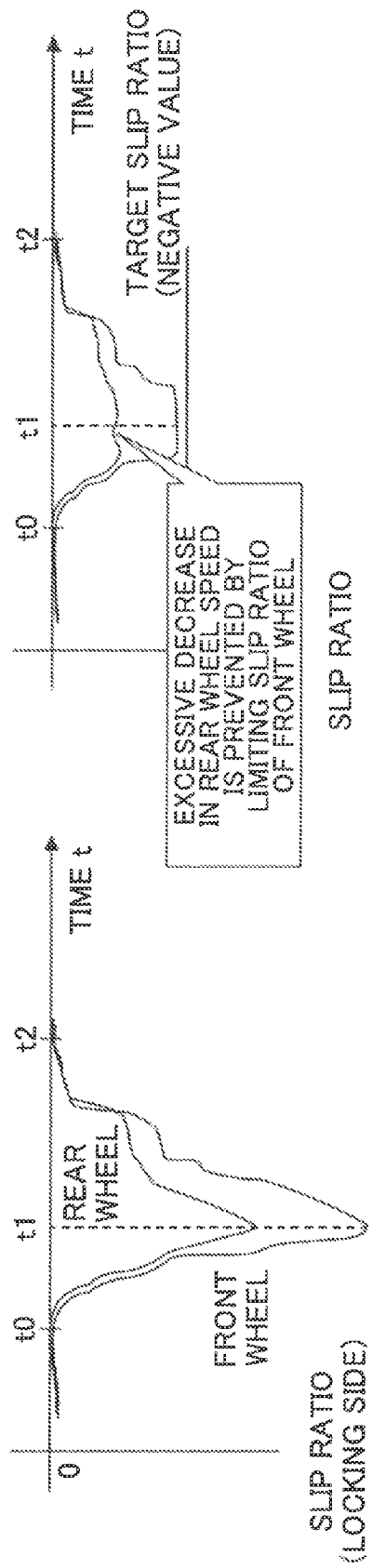
FIGS. 5A and 5B are graphs based on experimental results showing a relationship between the decrease in the slip ratio of an outer front wheel and the decrease in the slip ratio of a rear wheel.

FIGS. 5A and 5B are graphs based on experimental results showing the decrease in the speed of a rear wheel when the speed of the outer front wheel decreases relative to the speed of the inner front wheel used as a reference wheel. In each of FIGS. 5A and 5B, the horizontal axis indicates time and the vertical axis indicates slip ratios. As the slip ratio of a wheel increases, the wheel becomes more likely to lock.

FIG. 5A shows a relationship between slip ratios of the outer front wheel and the rear wheel when the slip ratio of the outer front wheel is not limited. As shown in FIG. 5A, at time t=0, the speed of the outer front wheel is not decreased. At time t=t0, the speed of the outer front wheel starts to decrease and the slip ratio starts to increase. At time t=t1, the speed of the outer front wheel becomes minimum and the slip ratio becomes maximum. And, at time t=t2, the speed of the outer front wheel returns to the same speed as that of the reference wheel and the slip ratio becomes zero. The speed and the slip ratio of the rear wheel change in a similar manner. Specifically, at t=t0, the speed of the rear wheel starts to decrease and the slip ratio starts to increase; at t=t1, the slip ratio becomes maximum; and at t=t2, the slip ratio returns to zero. Thus, as shown in FIG. 5A, the slip ratio of the rear wheel increases as the slip ratio of the outer front wheel increases.

FIG. 5B shows a relationship between slip ratios of the outer front wheel and the rear wheel when the slip ratio of the outer front wheel is controlled below a target slip ratio SL.

Also in this case, the slip ratio of the outer front wheel starts to increase at t=t0, becomes maximum at t=t1, and returns to zero at t=t2. However, the maximum slip ratio is controlled below the target slip ratio SL. The slip ratio of the rear wheel changes in a similar manner, and the maximum slip ratio of the rear wheel is also reduced because the maximum slip ratio of the outer front wheel is controlled below the target slip ratio SL. Thus, the slip ratios of the rear wheels can be reduced and an excessive decrease in the speeds of the rear wheels can be prevented by controlling the slip ratio of the outer front wheel below the target slip ratio SL.

Figure 6:
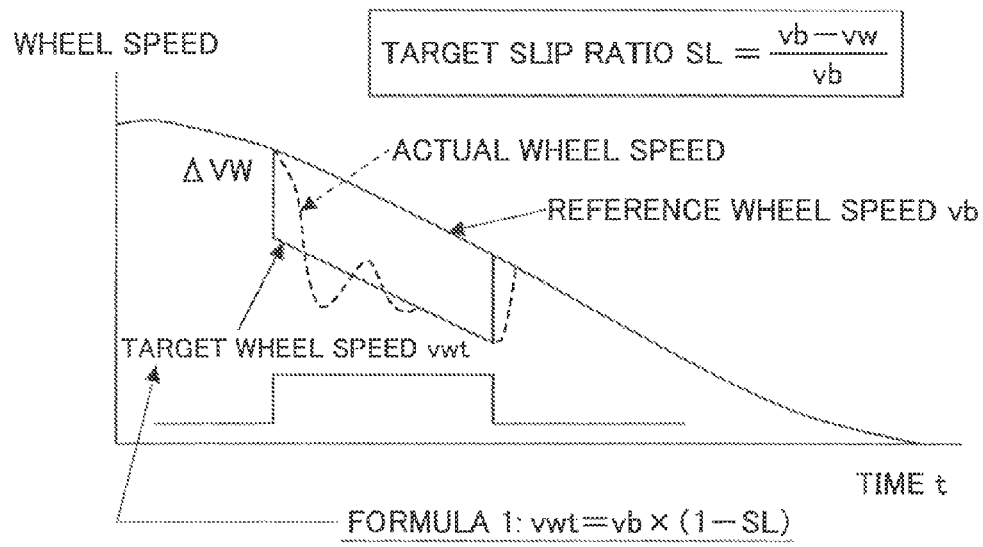
FIG. 6 is a graph showing how a target wheel speed vwt is controlled based on the target slip ratio SL.

FIG. 6 is a graph showing how a target wheel speed vwt is controlled based on the target slip ratio SL. In FIG. 6, the horizontal axis indicates time t and the vertical axis indicates the wheel speed. A characteristic curve in the graph indicates a reference wheel speed vb that is the wheel speed of the inner front wheel. The wheel speed of the inner front wheel is used as an approximate value of the vehicle speed. A rectangular wave in a lower part of the graph indicates a control flag of vehicle stability control. Vehicle stability control is performed while the control flag is ON. A straight line drawn below and parallel to the reference wheel speed curve vb indicates a target wheel speed vwt. A dotted curve along the target wheel speed line vwt indicates an actual wheel speed.

In FIG. 6, the target slip ratio SL is represented by a formula SL=(vb−vw)/vb where vb is the reference wheel speed and vw is a wheel speed. The target slip ratio SL is used to control a braking force to be applied to a wheel. During vehicle stability control, the brake control unit 50 applies a braking force to each of the control target wheels according to a braking amount set for the wheel. The braking amount is specified by the target slip ratio SL for the wheel.

For example, when the control flag shown in FIG. 6 is turned ON, vehicle stability control is started and each of the control target wheels is controlled according to the corresponding target wheel speed vwt that is less than the reference wheel speed vb and represented by an inverse square wave. A braking force is applied to the control target wheel according to the target wheel speed vwt and the actual wheel speed of the control target wheel changes accordingly. Although the actual wheel speed initially overshoots a little, it gradually becomes stable and matches the target wheel speed vwt. As soon as a desired stabilizing moment is obtained, the control flag is turned OFF and the target wheel speed vwt is returned to the reference wheel speed vb. Accordingly, the actual wheel speed returns to the reference wheel speed vb. The target slip ratios SL for the respective four wheels are calculated at the same time, and the above process is performed for each of the control target wheels (since one of the four wheels is a reference wheel, the process is performed for three of the four wheels).

As is evident from the formula SL=(vb−vw)/vb shown in FIG. 6 for obtaining the target slip ratio SL, the target wheel speed vwt can be determined by setting the target slip ratio SL. That is, the target wheel speed vwt is obtained by a formula 1 "vwt=vb×(1−SL)" that is obtained by substituting vwt for the wheel speed vw in the formula SL=(vb−vw)/vb and transforming the formula. Thus, the target wheel speed vwt for controlling the actual wheel speed of each control target wheel can be obtained by setting the target slip ratio SL.

Figure 7:
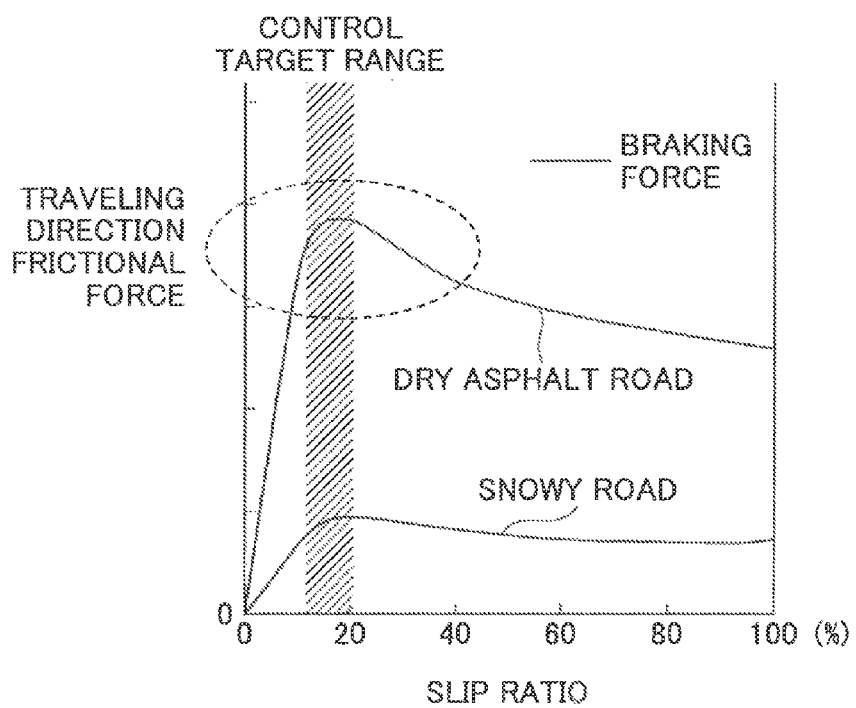
FIG. 7 is a graph showing a relationship between a slip ratio and a traveling direction frictional force.

Meanwhile, the target slip ratio SL is normally determined so as to optimize the frictional force or the braking force of a wheel. FIG. 7 is a graph showing a relationship between a slip ratio and a traveling direction frictional force. In FIG. 7, the horizontal axis indicates a slip ratio and the vertical axis indicates a traveling direction frictional force. One of the characteristic curves in FIG. 7 indicates a relationship between the slip ratio and the traveling direction frictional force on a dry asphalt road, and the other one of the characteristic curves indicates a relationship between the slip ratio and the traveling direction frictional force on a snowy road. As shown by the characteristic curves, to obtain enough braking force on an asphalt road or a snowy road, it is preferable to set the slip ratio within a control target range of between 10 and 20% or between about 10 and 30%. Although not shown, on an extremely-low-friction road such as an icy road, it is preferable to set the slip ratio between 7 and 8%.

Referring back to FIG. 6, let us think about the difference between the reference wheel speed vb and the target wheel speed vwt, i.e., a control amount ⊿vw=vb−vwt. According to the formula 1 "vwt=vb×(1−SL)", increasing the target slip ratio SL decreases the target wheel speed vwt and increases the control amount ⊿vw. On the other hand, decreasing the target slip ratio SL increases the target wheel speed vwt and decreases the control amount ⊿vw. Therefore, limiting the target slip ratio SL, which is a brake control target, to a small value prevents the value of the target wheel speed vwt from becoming too small and thereby prevents a target braking force from becoming too large.

As described above, the brake control device 80 of this embodiment is configured to prevent an excessive decrease in the speeds of the rear wheels caused by the directly-coupled front and rear propeller shafts 62F and 62R of a vehicle in the direct four-wheel drive mode by limiting the target slip ratios SL and thereby limiting the braking forces to be applied to the rear wheels. The target slip ratios SL can be determined appropriately for the respective control target wheels taking into account road conditions and the drive mode of a vehicle.

A slip ratio for optimizing the braking force of a wheel is determined based on a road surface friction coefficient as shown in FIG. 7. The slip ratio for the outer front wheel is preferably determined to achieve a large braking force. On the other hand, the slip ratios for the rear wheels are preferably determined so as to limit the braking forces to be applied to the rear wheels and thereby to prevent an excessive decrease in the speeds of the rear wheels caused by the direct four-wheel drive mode. Thus, optimum brake control for a vehicle in the direct four-wheel drive mode can be performed by setting the target slip ratios SL of the respective control target wheels according to the road surface friction coefficient.

Figure 8:
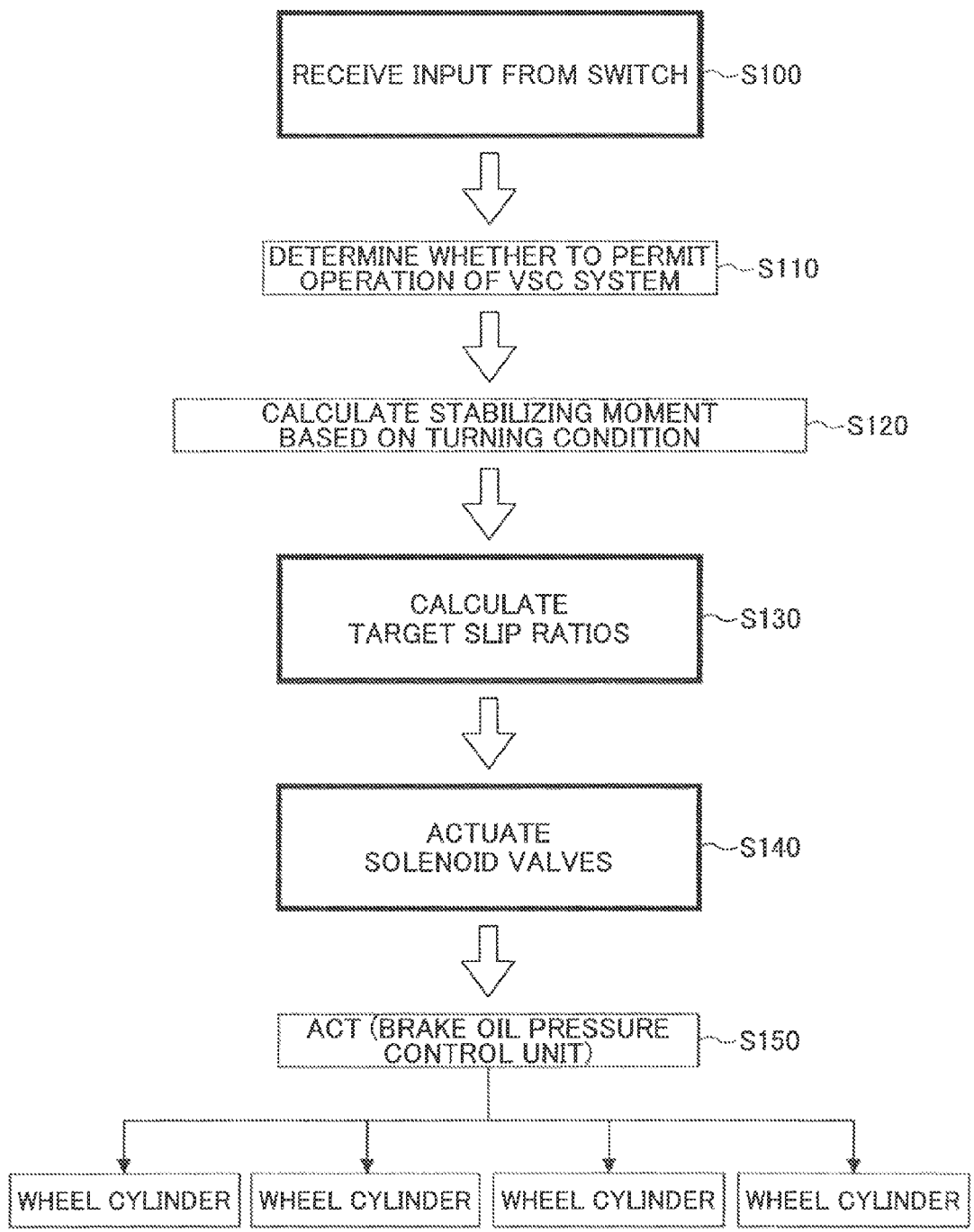
FIG. 8 is a drawing showing operations of the brake control device 80.

FIG. 8 is a drawing showing operations of the brake control device 80. In FIG. 8, the same reference numbers are used for components corresponding to those described above.

In step 100, an input from a switch is received. For example, the drive mode selection switch 61 is operated to select the center differential lock mode of a full-time four-wheel drive vehicle or the direct four-wheel drive mode of a part-time four-wheel drive vehicle. The vehicle may also include a switch to lock the rear differential. Further, the vehicle may include an input switch 41 as an operation mode selection switch for selecting a normal operation mode of the vehicle stability control (VSC) system or turning on and off traction control (TRC) of the VSC system.

The brake control device 80 of this embodiment performs brake control when a vehicle is in the center differential lock mode or the direct four-wheel drive mode and when the VSC system of the vehicle is in the normal operation mode. The brake control device 80 may be configured to be turned off when the rear differential is locked. The TRC reduces the slip of driving wheels by controlling the brake fluid pressure of the driving wheels and thereby controlling the engine output. The operation of the TRC is different from that of the brake control device 80 of this embodiment, and therefore it is preferable to provide a switch to turn on and off the TRC.

In this embodiment, the brake control device 80 determines whether a vehicle is in the direct four-wheel drive mode (or in the center differential lock mode) based on an input from a switch. Alternatively, the brake control device 80 may be configured to determine a drive mode based on an input from a sensor attached to the center differential 60*a*.

In step 110, the brake control device 80 determines whether to permit the operation of the vehicle stability control system. Specifically, the turning condition detection unit 10 determines whether the vehicle is sliding sideways and thereby determines whether to permit the operation of the vehicle stability control system. As described above with reference to FIG. 1, the turning condition detection unit 10 detects a turning condition based on outputs from the acceleration sensor 11, the yaw rate sensor 12, the steering angle sensor 13, and the wheel speed sensors 14*a*, 14*b*, 14*c*, and 14*d*.

In step 120, the braking amount setting unit 20 calculates a necessary stabilizing moment based on the turning condition detected by the turning condition detection unit 10. The stabilizing moment is determined so as to reduce the sideslip of the vehicle.

In step 130, the braking amount setting unit 20 calculates target slip ratios SL for the control target wheels (three wheels). The braking amount setting unit 20 calculates the target slip ratios SL for the control target wheels other than the reference wheel such as to cause the stabilizing moment calculated in step 120 and determines whether to output the calculated target slip ratios SL without change or to limit the target slip ratios SL. The braking amount setting unit 20 determines the upper limits of the target slip ratios SL based on the road surface friction coefficient $\mu$ of a current road estimated by the road surface friction coefficient estimation unit 30, and calculates and outputs braking amounts within the upper limits of the target slip ratios SL. The upper limits of the target slip ratios SL for the rear wheels may be set to zero. In this case, the target slip ratios SL for the rear wheels are not output, i.e., the rear wheels are, in effect, excluded from the control target wheels. For example, the upper limits of the target slip ratios SL for the rear wheels are set to zero when the vehicle is running on a road with a low or extremely-low road surface friction coefficient.

In step 140, the brake control unit 50 actuates solenoid valves based on the braking amounts output from the braking amount setting unit 30. The brake control unit 50, which is a brake actuator, actuates solenoid valves and thereby controls brake fluid pressures using a feedback control so that the control target wheels achieve the corresponding target slip ratios SL calculated in step 130.

In this step, the brake control unit 50 increases and decreases the brake fluid pressures to control the control target wheels. The brake control unit 50 may also be configured to decrease the brake fluid pressure for a wheel if it is determined that the wheel has locked. For example, a controlled parameter may be set such that the reaction rate of decompression or the reaction rate of deceleration is greatly increased. Whether a control target wheel has locked may be determined by comparing the speed of the reference wheel and the speed of the control target wheel. For example, it can be determined that a control target wheel has locked when its slip ratio exceeds 20%.

In step 150, the brake control unit 50, which is a brake actuator, controls oil pressures of the wheel cylinders 53*a*, 53*b*, 53*c*, and 53*d* of the control target wheels and thereby applies braking forces so that the control target wheels achieve the respective target slip ratios SL. When the target slip ratios SL are achieved, the process is terminated.

Figure 9:
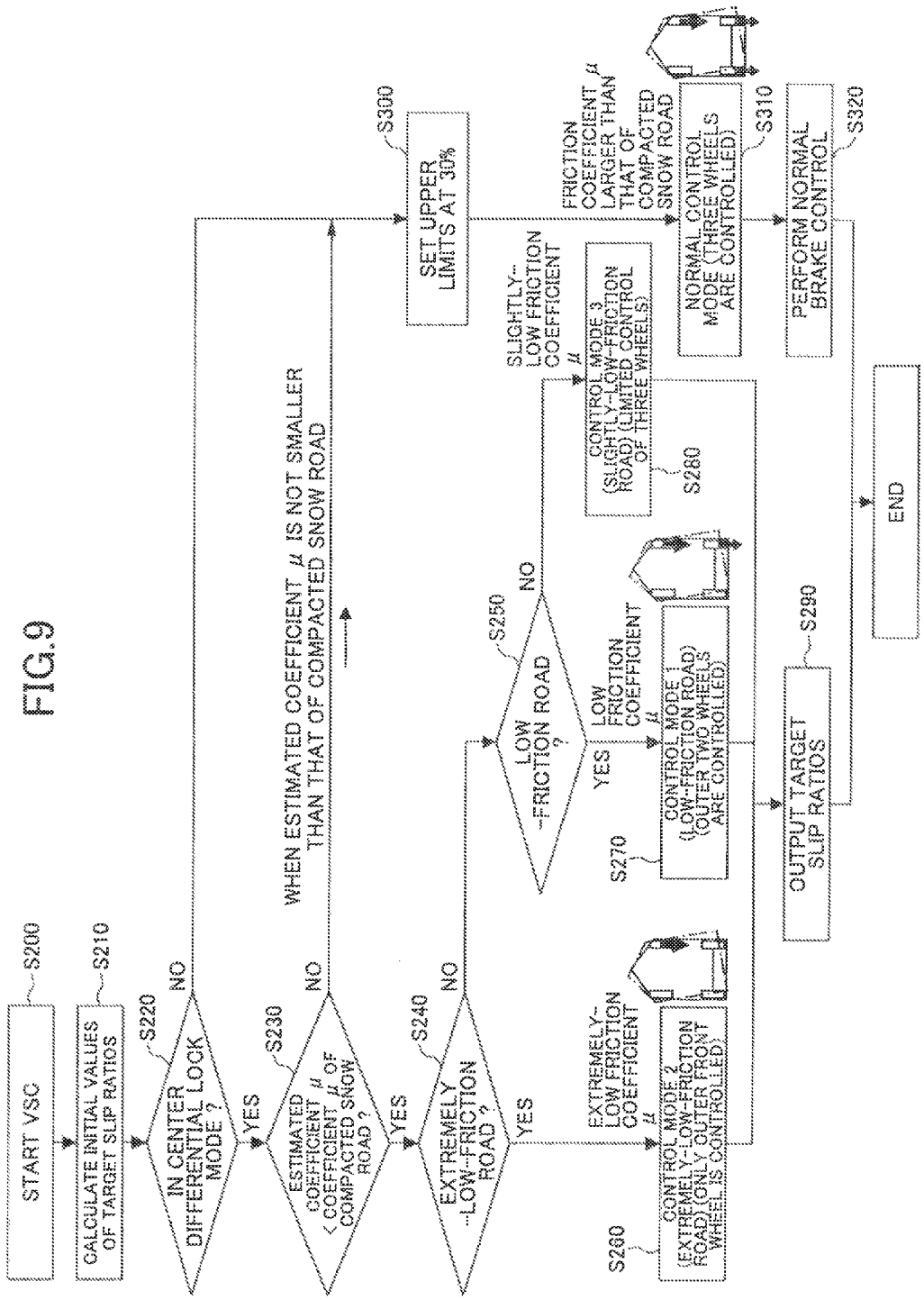
FIG. 9 is a flowchart showing a brake control process of the brake control device 80.

FIG. 9 is a flowchart showing a brake control process performed in steps 110 through 130 of FIG. 8. FIG. 9 shows a process where the braking amount setting unit 20 calculates braking amounts based on a turning condition detected by the turning condition detection unit 10 and a road surface friction coefficient $\mu$ estimated by the road surface friction coefficient estimation unit 30.

In step 200, a vehicle stability control (VSC) process is started. Step 200 corresponds to step 110 of FIG. 8.

In step 210, initial values of the target slip ratios SL for the respective wheels are calculated. The initial values of the target slip ratios SL indicate the values that are calculated just after the stabilizing moment is obtained and that are to be limited later. Step 210 corresponds to step 120 of FIG. 8. The initial values of the target slip ratios SL are calculated based on the stabilizing moment that is calculated by the braking amount setting unit 20 based on the turning condition detected by the turning condition detection unit 10.

In step 220, it is determined whether the vehicle is in the center differential lock mode, i.e., the direct four-wheel drive mode. The upper limits of the target slip ratios SL are determined based on the result of this step, i.e., based on whether the vehicle is in the direct four-wheel drive mode. Step 220 may correspond to step 100 of FIG. 8. If the vehicle is in the direct four-wheel drive mode, the process proceeds to step 230. If the vehicle is not in the direct four-wheel drive mode, the process proceeds to step 300. If the vehicle is not in the direct four-wheel drive mode, a normal vehicle stability control process may be performed instead of a control process by the brake control device 80 of this embodiment.

In step 230, it is determined whether the road surface friction coefficient $\mu$ estimated by the road surface friction coefficient estimation unit 30 is less than that of a compacted snow road. As described above, the brake control device 80 changes the target slip ratios SL, i.e., the upper limits of braking amounts according to the road surface friction coefficient $\mu$. In step 230, the friction coefficient $\mu$ of a compacted snow road is used as a threshold and is compared with the road surface friction coefficient $\mu$ of a current road. The road surface friction coefficient $\mu$ of a compacted snow road is normally about 0.3. If the road surface friction coefficient $\mu$ of the current road is greater than 0.3, the vehicle may be controlled by a normal vehicle stability control process. If the road surface friction coefficient $\mu$ of the current road is less than that of the compacted snow road, the process proceeds to step 240. If not, the process proceeds to step 300 as in the case where the vehicle is not in the direct four-wheel drive mode.

In step 240, it is determined whether the current road is an "extremely-low-friction road" based on the estimated road surface friction coefficient $\mu$. In the brake control device 80 of this embodiment, the extremely-low-friction road is treated as a lowest-friction road. For example, the extremely-low-friction road indicates an icy road with a road surface friction coefficient $\mu$ less than about 0.1. However, a threshold used to determine whether a road is the extremely-low-friction road may change depending on vehicle and environmental conditions and is therefore not limited to the value mentioned above. In this embodiment, the extremely-low-friction road indicates a road with a friction coefficient $\mu$ that is less than the lowest one of threshold values (reference friction coefficients) set in the brake control device 80.

In step 240, if the estimated road surface coefficient $\mu$ is less than a first threshold value, it is determined that the current road is an extremely-low-friction road and the process proceeds to step 260. If the estimated road surface coefficient $\mu$ is equal to or greater than the first threshold value, it is determined that the current road is not an extremely-low-friction road and the process proceeds to step 250.

In step 260, a brake control request suitable for the extremely-low-friction road is generated. For example, a brake control request to apply a braking force only to the outer front wheel is generated. As described above, if braking forces are applied to the rear wheels of a vehicle in the direct four-wheel drive mode on an extremely-low-friction road such as an icy road, the speeds of the rear wheels may decrease excessively. In step 260, a braking force is applied only to the outer front wheel to prevent this problem. The brake control request is generated by the braking amount setting unit 20. Following step 260, the process proceeds to step 290.

In step 290, the braking amount setting unit 20 outputs the target slip ratio SL for the control target wheel to the brake control unit 50, and the process is terminated. Thus, on an extremely-low-friction road, a target slip ratio SL within an upper limit is output for the outer front wheel, but no target slip ratio SL is output for the rear wheels. The target slip ratio SL may be converted into a fluid pressure value by the braking amount setting unit 20 or by the brake control unit 50.

Returning to step 240, if the estimated road surface coefficient μ is equal to or greater than the first threshold value, it is determined that the current road is not an extremely-low-friction road and the process proceeds to step 250.

In step 250, it is determined whether the current road is a "low-friction road" based on the estimated road surface friction coefficient μ. In other words, after the current road is determined not to be an extremely-low-friction road in step 240, step 250 determines whether the current road is a low-friction road with a friction coefficient slightly greater than that of the extremely-low-friction road or is a slightly-low-friction road with a friction coefficient greater than that of the low-friction road. For example, a low-friction road indicates a road covered by ice and snow and having a road surface friction coefficient μ slightly greater than that of an icy road. In this embodiment, the low-friction road indicates a road with a friction coefficient μ less than a second threshold value that is the second lowest threshold value set in the brake control device 80. For example, assuming that the first threshold value is 0.1, the second threshold value may be set to 0.17 or 0.18. If it is determined that the current road is a low-friction road in step 250, the process proceeds to step 270; and if not, the process proceeds to step 280.

In step 270, a brake control request suitable for the low-friction road is generated. For example, a brake control request to apply braking forces to the outer front and rear wheels is generated. In the case of the low-friction road, the road surface friction coefficient μ is slightly greater than that of the extremely-low-friction road. Therefore, the decrease in the speeds of the rear wheels is not as great as that on the extremely-low-friction road. Still, the decrease may be greater than that on a road with a normal road surface friction coefficient μ. Therefore, in the case of the low-friction road, a braking force is applied to the outer rear wheel in addition to the outer front wheel. Thus, in this embodiment, brake control is performed according to the friction coefficient of a road. More specifically, if the vehicle is on a road with a friction coefficient less than the second threshold value, the number of control target wheels is determined to be greater than that on a road with a friction coefficient less than the first threshold value and to be less than that on a road with a normal friction coefficient. Following step 270, the process proceeds to step 290.

In step 290, the braking amount setting unit 20 outputs target slip ratios SL or fluid pressure values corresponding to the target slip ratios SL for the respective control target wheels to the brake control unit 50. After brake control is performed by the brake control unit 50, the process is terminated. Thus, on a low-friction road, target slip ratios SL within the specified upper limits are output for the outer front and rear wheels, but no target slip ratio SL is output for the inner rear wheel.

Returning to step 250, if the estimated road surface coefficient μ is equal to or greater than the second threshold value, it is determined that the current road is not a low-friction road and the process proceeds to step 280.

In this case, the current road is a slightly-low-friction road with a road surface friction coefficient μ less than that of the low-friction road. Therefore, in step 280, a brake control request to apply braking forces to three wheels is generated as in a normal vehicle stability control process. However, because the road surface friction coefficient μ of the slightly-low-friction road is still less than that of the compacted snow road determined in step 230, it is preferable to set the upper limits of the target slip ratios SL less than those in a normal vehicle stability control process. Specifically, assuming that the upper limits of the target slip ratios SL for the three control target wheels excluding the inner front wheel are set at about 30% in a normal vehicle stability control process, the upper limits of the target slip ratios SL on the slightly-low-friction road may be set between about 5 and 10% for the front wheel and between about 0 and 5% for the rear wheels. Thus, this embodiment makes it possible to gradually increase the target slip ratios SL for three control target wheels along with the increase of the road surface friction coefficient μ and thereby makes it possible to perform appropriate brake control according to the road surface friction coefficient μ. Following step 280, the process proceeds to step 290.

In step 290, the braking amount setting unit 20 outputs braking amounts corresponding to the target slip ratios SL for the respective control target wheels to the brake control unit 50. Then, the brake control unit 50 applies braking forces within the braking amounts to the respective wheels, and the process is terminated.

If the vehicle is not in the center differential lock mode, i.e., the direct four-wheel drive mode in step 220 or if the road surface friction coefficient μ of the current road is not less than that of a compacted snow road, the process proceeds to step 300.

In step 300, the braking amount setting unit 20 sets the upper limits of the target slip ratios SL, for example, at 30%. The target slip ratios SL of 30% are substantially the same as those used in a normal vehicle stability control process and, as shown in FIG. 7, are suitable to cause optimum braking forces on a normal road. If the vehicle is determined not to be in the direct four-wheel drive mode in step 220, it indicates that a full-time four-wheel drive vehicle is in a mode that allows the front and rear propeller shafts 62F and 62R to rotate at different speeds or that a part-time four-wheel drive vehicle is in the two-wheel drive mode. Therefore, in this case, the rotational speeds of the rear wheels do not decrease excessively even when a normal vehicle stability control process is performed.

Even if the vehicle is determined to be in the direct four-wheel drive mode in step 220, the rotational speeds of the rear wheels may not decrease excessively if it is determined in step 230 that the estimated road surface friction coefficient μ is equal to or greater than that of the compacted snow road. Therefore, also in this case, the upper limits of the target slip ratios SL may be set at similar values to those used in a normal vehicle stability control process. Following step 300, the process proceeds to step 310.

In step 310, the braking amount setting unit 20 generates a brake control request to apply braking forces to three wheels according to normal target slip ratios SL. In other words, the braking amount setting unit 20 calculates a stabilizing moment based on a turning condition detected by the turning condition detection unit 10, sets braking amounts within which braking forces are to be applied to the wheels to achieve the stabilizing moment, and outputs the braking amounts to the brake control unit 50. Following step 310, the process proceeds to step 320.

In step 320, the brake control unit 50 performs normal brake control, and the process is terminated.

Thus, the brake control device 80 of this embodiment determines the number of control target wheels and limits braking amounts by, for example, target slip ratios according to the road surface friction coefficient μ, and thereby makes it possible to safely perform brake control even when a vehicle is in the direct four-wheel drive mode. As described above, the brake control process of this embodiment branches into four control modes. However, the number and types of the control modes may also be changed according to factors other than the vehicle type and the road surface friction coefficient μ.

Calculation of the upper limits of braking amounts for the control target wheels is described below with reference to FIG. 10. FIG. 10 is a drawing used to describe calculation of the upper limits of braking amounts by the braking amount setting unit 20.

FIG. 10 (a) shows exemplary upper limits of the target slip ratio SL for the outer front wheel. FIG. 10 (b) shows exemplary upper limits of the target slip ratios SL for the rear wheels. In (a) and (b) of FIG. 10, the horizontal axis indicates the estimated road surface friction coefficient μ and the vertical axis indicates the target slip ratio SL [%]. In FIG. 10, the range of the road surface friction coefficients μ less than 0.1 indicates an extremely-low-friction road such as an icy road, a range of $0.1 \leq \mu \leq 0.18$ indicates a low-friction road covered with more snow than the extremely-low-friction road, a range of $0.18 < \mu \leq \sim 0.25$ indicates a slightly-low-friction road covered with less ice than the low-friction road, and a range of $0.25 < \mu \leq \sim 0.3$ indicates a very-slightly-low-friction road with a road surface friction coefficient μ that is greater than that of the slightly-low-friction road but less than that of a normal road.

As shown in FIG. 10 (a), the upper limit of the target slip ratio SL changes along with the estimated road surface friction coefficient μ. When the estimated friction coefficient μ is less than 0.1, the upper limit of the target slip ratio SL is constant at 5%. When the estimated friction coefficient μ is between 0.1 and 0.25, the upper limit changes linearly between 5 and 10%. When the estimated friction coefficient μ is greater than 0.25 and not greater than 0.3, the upper limit is constant at 10%. Let us assume that about 5% is preferable as the upper limit of the target slip ratio SL on an extremely-low-friction road such as an icy road with a friction coefficient μ less than 0.1, and 10% is preferable as the upper limit on a road with a friction coefficient μ greater than 0.25 that is slightly less than that of a compacted snow road. Based on this assumption, a straight line as shown in FIG. 10 (a) can be obtained by connecting the two values (5% and 10%). Once the straight line is obtained, it is possible to gradually increase the upper limit of the target slip ratio SL along the straight line according to the change of the road surface friction coefficient μ. This method makes it possible to prevent a drastic change in the upper limit of the target slip ratio SL in response to the change in the road surface friction coefficient μ and thereby to prevent a sudden change in the wheel speed. Thus, once preferable upper limits of the target slip ratio SL are obtained for some road surface friction coefficients μ, upper limits of the target slip ratio SL for other road surface friction coefficients μ can be obtained by filling the gap between the preferable upper limits.

Setting the upper limits of the target slip ratio SL makes it possible to prevent a situation where excessive braking forces are applied to wheels and thereby makes it possible to effectively control the behavior of the vehicle. For example, even if the initial value of the target slip ratio SL calculated based on the stabilizing moment is 8% on an extremely-low-friction road with a friction coefficient μ of 0.1, the target slip ratio SL is set at 5% if the upper limit is 5%. In FIG. 10 (a), the upper limit of the target slip ratio SL is set between 5 and 10%. This setting is substantially identical with the setting described with reference to FIG. 7 where the upper limit is set between about 7 and 8% on an icy road. In both cases, the upper limit of the target slip ratio SL for the outer front wheel is set at a comparatively high value so that a fairly large braking force is applied to the outer front wheel.

FIG. 10 (b) shows a relationship between the estimated road surface friction coefficient μ and target slip ratios SL for the rear wheels. As shown in FIG. 10 (b), the target slip ratios SL for the rear wheels are set between 0 and 5%. In the direct four-wheel drive mode, the rotational speeds of the rear wheels are influenced by the braking torque caused by the outer front wheel. Therefore, the upper limits of the target slip ratios SL for the rear wheels are set at values less than those of the outer front wheel to prevent application of excessive braking forces. In FIG. 10 (b), different upper limits are set for the outer rear wheel and the inner rear wheel. In the case of front wheels, because only the outer front wheel is controlled, the upper limit of the target slip ratio SL is set only for the outer front wheel. On the other hand, in the case of rear wheels, because both the outer and inner rear wheels are controlled and suitable braking forces for them are slightly different, upper limits are set for the respective outer and inner rear wheels.

As shown in FIG. 10 (b), on an extremely-low-friction road with a friction coefficient μ less than 0.1, the upper limits of the target slip ratios SL for the outer and inner rear wheels are both set to zero. The upper limits are set to zero and the rear wheels are, in effect, excluded from the control target wheels because the influence of the decrease in the rotational speeds of the rear wheels caused by the direct four-wheel drive mode is large on an extremely-low-friction road. Thus, on an extremely-low-friction road, only the outer front wheel is controlled.

When the estimated road surface friction coefficient μ is between 0.1 and 0.18, a positive upper limit is set only for the target slip ratio SL of the outer rear wheel and the upper limit for the inner rear wheel remains zero. In this case, the outer front and rear wheels are controlled. The upper limit of the target slip ratio SL for the outer rear wheel is increased gradually along with the increase of the estimated road surface friction coefficient μ to prevent a sudden increase in the wheel speed. Thus, this embodiment makes it possible to smoothly change the number of control target wheels from one to two along with the increase of the estimated road surface friction coefficient μ, instead of changing the number of control target wheels abruptly at a certain threshold value.

When the estimated road surface friction coefficient μ is greater than 0.18, a positive upper limit is set also for the target slip ratio SL of the inner rear wheel and the inner rear wheel is added to the control target wheels. At this stage, the number of the control target wheels becomes three that is the same as in a normal vehicle stability control process. Still, the upper limits of the target slip ratios SL are set between 0 and 5% that are less than those used in a normal vehicle stability control process. Also, the upper limit of the target slip ratio SL for the inner rear wheel is set at a value slightly less than that for the outer rear wheel. The upper limit of the target slip ratio SL for the inner rear wheel is also increased gradually along with the increase of the estimated road surface friction coefficient μ.

When the estimated road surface friction coefficient μ is greater than 0.25, the upper limits of the target slip ratios SL for the outer and inner rear wheels are both set at 5%. Thus, on a snowy road with a road surface friction coefficient μ slightly less than that of a compacted snow road, the upper limits are set at a value less than a normal upper limit of 30% so that the rotational speeds of the rear wheels are not decreased excessively.

As described above with reference to FIG. 10, an embodiment of the present invention makes it possible to set appropriate upper limits for the respective target slip ratios SL of the outer front wheel, the outer rear wheel, and the inner rear wheel according to the road surface friction coefficient μ which upper limits are less than those used in a normal vehicle stability control process. This in turn makes it possible to determine appropriate braking forces to be applied to the wheels and thereby to perform vehicle stability control even when a vehicle is in the direct four-wheel drive mode. The target slip ratios SL and the road surface friction coefficients μ show in FIG. 10 are examples and may vary depending on vehicle types and environments. The estimated road surface friction coefficients μ of 0.1 and 0.18 shown in FIG. 10, respectively, correspond to the first threshold value and the second threshold value described with reference to FIG. 9.

FIG. 11 is a flowchart showing another brake control process of the brake control device 80, which is different from that shown in FIG. 9. In the descriptions below, details of steps that correspond to those described above are omitted.

In step 400, a vehicle stability control (VSC) process is started. As described with reference to FIG. 6, when the VSC control flag is turned ON, the braking amount setting unit 20 calculates a stabilizing moment based on a turning condition detected by the turning condition detection unit 10 and calculates braking amounts based on the stabilizing moment.

In step 410, it is determined whether the vehicle is in the center differential lock mode, i.e., the direct four-wheel drive mode. If the vehicle is in the direct four-wheel drive mode, the process proceeds to step 420. If the vehicle is not in the direct four-wheel drive mode, the process proceeds to step 450.

In step 420, it is determined whether the current road is an extremely-low-friction road. In the corresponding step in FIG. 9, it is determined whether the road surface friction coefficient μ of the current road is less than that of a compacted snow road. Instead, in the process of FIG. 10, a control mode where the target slip ratios SL are limited is selected regardless of the value of the road surface friction coefficient μ as long as the vehicle is in the direct four-wheel drive mode. This approach is suitable for a vehicle that is likely to be much influenced by the decrease in the speeds of the rear wheels even when the road surface friction coefficient μ is relatively high. If the current road is an extremely-low-friction road, the process proceeds to step 430. If the current road is not an extremely-low-friction road but a low-friction road, the process proceeds to step 440.

In step 430, only the outer front wheel is controlled. As already explained, on an extremely-low-friction road such as an icy road, it is preferable not to apply braking forces to the rear wheels to avoid excessive decrease in their rotational speeds.

Returning to step 420, if the current road is not an extremely-low-friction road, the process proceeds to step 440 where brake control is performed on the outer front and rear wheels. In this case, the number of control target wheels is increased to two because the likelihood of excessive decrease in the rotational speeds of the rear wheels is less than that on an extremely-low-friction road. As described above, the brake control process described with reference to FIGS. 9 and 10 includes a control mode corresponding to the road surface friction coefficient μ of $0.18 \leq \mu < 0.3$ where three wheels are controlled according to the target slip ratios SL that are set lower than those in a normal vehicle stability control process. In the brake control process of FIG. 11, the number of control modes is reduced and the outer two wheels are controlled both on a low-friction road and a slightly-low-friction road.

Returning to step 410, if the vehicle is not in the center differential lock mode, i.e., the direct four-wheel drive mode, the process proceeds to step 450 where three wheels are controlled in a normal control mode. In other words, when a vehicle is not in the direct four-wheel drive mode, normal brake control is performed.

Thus, the brake control process of FIG. 11 includes a lesser number of control modes and is therefore simpler than the brake control process of FIG. 9. The brake control process of FIG. 11 may be employed for a certain type of vehicle or by the request of a user. Meanwhile, the number of threshold values of the road surface friction coefficient μ for selecting control modes and the number of steps of the upper limit of the target slip ratio SL shown in FIG. 10 may be increased to perform optimum brake control for individual cases. Thus, the brake control device 80 of this embodiment can set the upper limits of braking amounts according to various conditions and thereby flexibly perform brake control.

The present invention is not limited to the specifically disclosed embodiments, and variations and modifications may be made without departing from the scope of the present invention.

The present international application claims priority from Japanese Patent Application No. 2006-333671 filed on Dec. 11, 2006, the entire contents of which are hereby incorporated herein by reference.

The invention claimed is:

1. A brake control device for controlling braking forces applied to wheels and thereby stabilizing behavior of a vehicle turning a corner, comprising:
a turning condition detection unit configured to detect a turning condition of the vehicle;
a braking amount setting unit configured to set braking amounts for the respective wheels of the vehicle based on the turning condition detected by the turning condition detection unit;
a brake control unit configured to apply braking forces to the wheels according to the braking amounts set by the braking amount setting unit; and
a road surface friction coefficient estimation unit configured to estimate a road surface friction coefficient of a road on which the vehicle is running;
wherein the braking amount setting unit is configured to change, when the vehicle is in a center differential lock mode or a direct four-wheel drive mode, upper limits of the braking amounts for the respective wheels according to the road surface friction coefficient estimated by the road surface friction coefficient estimation unit, to gradually increase target slip ratios for three of the wheels as the road surface friction coefficient increases, and wherein if the road surface friction coefficient of the road is less than a predetermined value and the vehicle is in the center differential lock mode or the direct four-wheel drive mode, the braking amount setting unit is configured to set the upper limits of the braking amounts less than those that the braking setting unit is configured to set under an equivalent road surface friction coefficient condition when the vehicle is not in the center differential lock mode or the direct four-wheel drive mode.

2. The brake control device as claimed in claim 1, wherein the predetermined value is approximately 0.3.

3. The brake control device as claimed in claim 1, wherein if the road surface friction coefficient is less than a first threshold value, the braking amount setting unit is configured to set the upper limits of the braking amounts for rear wheels to zero and to set the braking amount only for an outer front wheel.

4. The brake control device as claimed in claim 3, wherein if the road surface friction coefficient is not less than the first threshold value and not greater than a second threshold value, the braking amount setting unit is configured to set the upper limit of the braking amount for an inner rear wheel to zero and to set the braking amounts for the outer front wheel and an outer rear wheel.

5. The brake control device as claimed in claim 4, wherein if the road surface friction coefficient is greater than the second threshold value, the braking amount setting unit is configured to set the braking amounts for three wheels other than an inner front wheel.

6. The brake control device as claimed in claim 2, wherein if the road surface friction coefficient is less than a first threshold value, the braking amount setting unit is configured to set the upper limits of the braking amounts for rear wheels to zero and to set the braking amount only for an outer front wheel.

7. The brake control device as claimed in claim 6, wherein if the road surface friction coefficient is not less than the first threshold value and not greater than a second threshold value, the braking amount setting unit is configured to set the upper limit of the braking amount for an inner rear wheel to zero and to set the braking amounts for the outer front wheel and an outer rear wheel.

8. The brake control device as claimed in claim 7, wherein if the road surface friction coefficient is greater than the second threshold value, the braking amount setting unit is configured to set the braking amounts for three wheels other than an inner front wheel.

9. A brake control device for controlling braking forces applied to wheels and thereby stabilizing behavior of a vehicle turning a corner, comprising:
   a turning condition detection unit configured to detect a turning condition of the vehicle;
   a braking amount setting unit configured to set braking amounts for the respective wheels of the vehicle based on the turning condition detected by the turning condition detection unit;
   a brake control unit configured to apply braking forces to the wheels according to the braking amounts set by the braking amount setting unit; and
   a road surface friction coefficient estimation unit configured to estimate a road surface friction coefficient of a road on which the vehicle is running;
   wherein the braking amount setting unit is configured to change upper limits of the braking amounts for the respective wheels according to the road surface friction coefficient estimated by the road surface friction coefficient estimation unit when the vehicle is in a center differential lock mode or a direct four-wheel drive mode,
   wherein if the road surface friction coefficient is less than a first threshold value, the braking amount setting unit is configured to set the upper limits of the braking amounts for rear wheels to zero and to set the braking amount only for an outer front wheel, and
   wherein if the road surface friction coefficient is not less than the first threshold value and not greater than a second threshold value, the braking amount setting unit is configured to set the upper limit of the braking amount for an inner rear wheel to zero and to set the braking amounts for the outer front wheel and an outer rear wheel.

10. The brake control device as claimed in claim 9, wherein if the road surface friction coefficient is greater than the second threshold value, the braking amount setting unit is configured to set the braking amounts for three wheels other than an inner front wheel.

11. A brake control device for controlling braking forces applied to wheels and thereby stabilizing behavior of a vehicle turning a corner, comprising:
   a turning condition detection unit configured to detect a turning condition of the vehicle;
   a braking amount setting unit configured to set braking amounts for the respective wheels of the vehicle based on the turning condition detected by the turning condition detection unit;
   a brake control unit configured to apply braking forces to the wheels according to the braking amounts set by the braking amount setting unit; and
   a road surface friction coefficient estimation unit configured to estimate a road surface friction coefficient of a road on which the vehicle is running;
   wherein the braking amount setting unit is configured to change upper limits of the braking amounts for the respective wheels according to the road surface friction coefficient estimated by the road surface friction coefficient estimation unit when the vehicle is in a center differential lock mode or a direct four-wheel drive mode,
   wherein if the road surface friction coefficient of the road is less than approximately 0.3, the braking amount setting unit is configured to set the upper limits of the braking amounts less than those used when the vehicle is not in the center differential lock mode or the direct four-wheel drive mode,
   wherein if the road surface friction coefficient is less than a first threshold value, the braking amount setting unit is configured to set the upper limits of the braking amounts for rear wheels to zero and to set the braking amount only for an outer front wheel, and
   wherein if the road surface friction coefficient is not less than the first threshold value and not greater than a second threshold value, the braking amount setting unit is configured to set the upper limit of the braking amount for an inner rear wheel to zero and to set the braking amounts for the outer front wheel and an outer rear wheel.

12. The brake control device as claimed in claim 11, wherein if the road surface friction coefficient is greater than the second threshold value, the braking amount setting unit is configured to set the braking amounts for three wheels other than an inner front wheel.

* * * * *